(12) United States Patent
Breeden

(10) Patent No.: US 12,530,093 B1
(45) Date of Patent: Jan. 20, 2026

(54) FINGER COVERING STYLUS

(71) Applicant: Sean Breeden, Purcellville, VA (US)

(72) Inventor: Sean Breeden, Purcellville, VA (US)

( * ) Notice: Subject to any disclaimer, the term of this patent is extended or adjusted under 35 U.S.C. 154(b) by 0 days.

(21) Appl. No.: 17/574,367

(22) Filed: Jan. 12, 2022

(51) Int. Cl.
*G06F 3/0354* (2013.01)
*G06F 3/01* (2006.01)
*G06F 21/12* (2013.01)
*G06F 21/32* (2013.01)
*G06F 21/44* (2013.01)
*G06V 40/12* (2022.01)

(52) U.S. Cl.
CPC .......... *G06F 3/03546* (2013.01); *G06F 3/014* (2013.01); *G06F 21/121* (2013.01); *G06F 21/32* (2013.01); *G06F 21/44* (2013.01); *G06V 40/1365* (2022.01); *G06F 2221/2141* (2013.01)

(58) Field of Classification Search
CPC .... G06F 3/03546; G06F 3/014; G06F 21/121; G06F 21/32; G06F 21/44; G06F 2221/2141; G06V 40/1365
USPC .......................................................... 345/173
See application file for complete search history.

(56) References Cited

U.S. PATENT DOCUMENTS

| | | | | |
|---|---|---|---|---|
| 2001/0030668 A1* | 10/2001 | Erten | ..................... | G06F 3/0304 715/863 |
| 2001/0053306 A1* | 12/2001 | Schneider | ............ | B43K 23/012 401/258 |
| 2008/0314082 A1* | 12/2008 | Nanasi | ..................... | A44C 9/02 63/15.6 |
| 2015/0277559 A1* | 10/2015 | Vescovi | .................. | G06F 3/017 345/173 |
| 2016/0209934 A1* | 7/2016 | Yano | ........................ | G06F 3/014 |
| 2019/0155385 A1* | 5/2019 | Lim | ........................ | G06F 3/033 |

* cited by examiner

*Primary Examiner* — Mark Edwards
(74) *Attorney, Agent, or Firm* — The Iwashko Law Firm, PLLC; Lev Ivan Gabriel Iwashko

(57) ABSTRACT

A finger covering stylus to be worn on at least one of a thumb and a finger of a user, the finger covering stylus including a main body, and a stylus tip disposed on at least a portion of the main body to removably connect to a touchscreen of an external device, such that the stylus tip provides an input on the touchscreen of the external device in response to contacting the touchscreen.

9 Claims, 3 Drawing Sheets

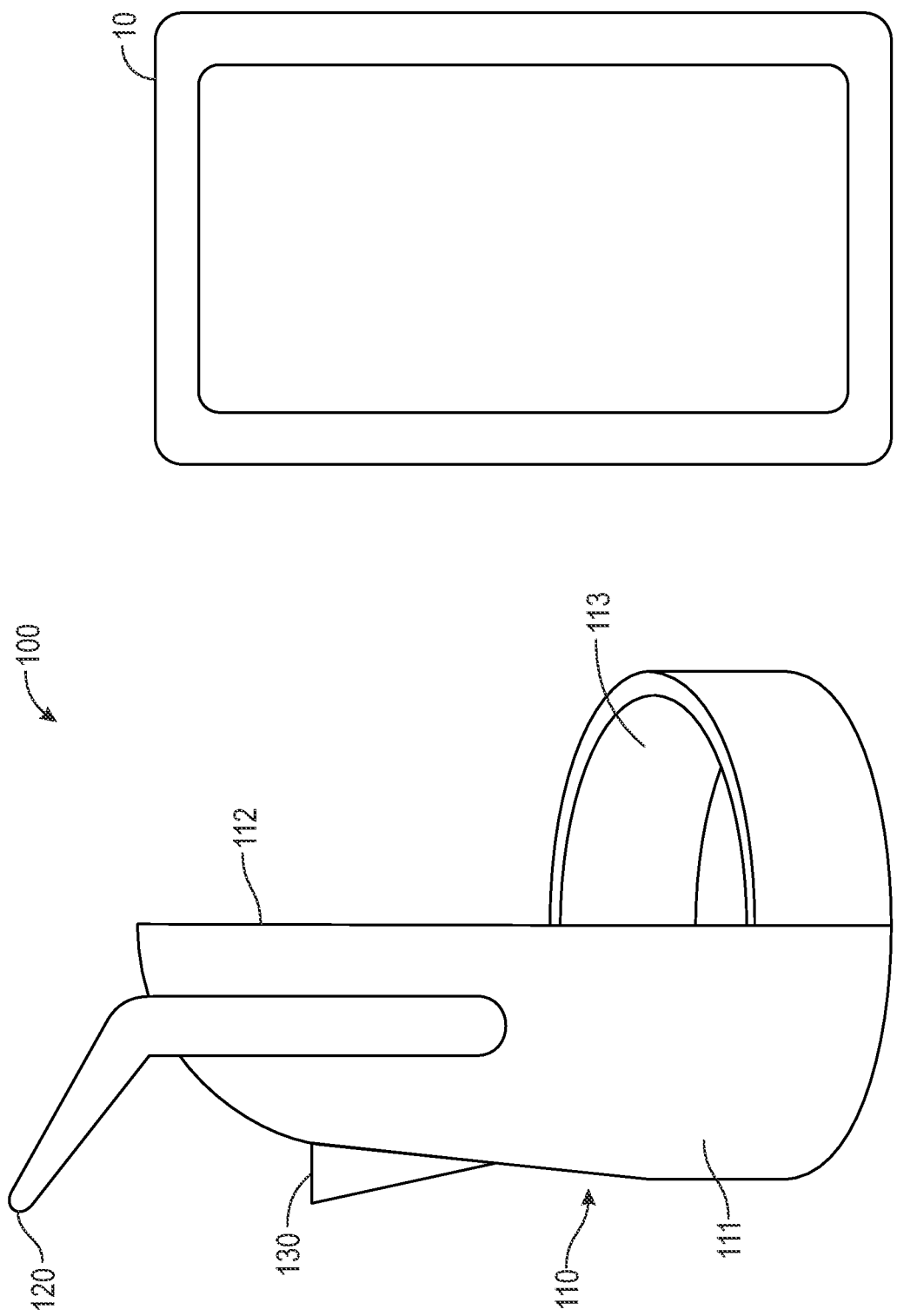

FINGER COVERING STYLUS

BACKGROUND

1. Field

The present general inventive concept relates generally to a stylus, and particularly, to a finger covering stylus.

2. Description of the Related Art

Currently, many electronic devices use a touchscreen to receive an input. The touchscreen facilitates immediate interaction with content that is being displayed on a screen. However, the touchscreen is sensitive to touch, which often results in an accidental click. Although these types of mistakes are usually harmless, in other cases it can be disastrous. For example, the touchscreen could register an inadvertent touch as a confirmed purchase order, transfer of money, and/or transmittal of private information.

Moreover, the touchscreen is home to various pathogens, such as bacteria, viruses, fungi, and/or parasites. As such, the touchscreen can be a vector of transmission for disease.

Some electronic devices use a stylus to facilitate input on the touchscreen. The stylus is pen and/or pencil shaped, which can make it difficult to use for some users.

Therefore, there is a need for a finger covering stylus that provides precision to contact the touchscreen, as well as, eliminates direct contact of the touchscreen with a finger.

SUMMARY

The present general inventive concept provides a finger covering stylus.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a finger covering stylus to be worn on at least one of a thumb and a finger of a user, the finger covering stylus including a main body, and a stylus tip disposed on at least a portion of the main body to removably connect to a touchscreen of an external device, such that the stylus tip provides an input on the touchscreen of the external device in response to contacting the touchscreen.

The main body may include a rear side disposed on a first side of the main body, a front side disposed on a second side of the main body opposite with respect to the first side, and a strap movably disposed on at least a portion of a first edge of the front side and removably connected to at least a portion of a second edge of the front side to prevent the main body from moving away from at least one of the thumb and the finger while being worn.

The strap and a tip of the front side may form a space therebetween.

The stylus tip may emit a beam of light therefrom to identify a direction of where the stylus tip is pointed.

The finger covering stylus may further include a finger tab removably connected to at least a portion of the main body to adjust a height of the main body with respect to a surface in contact with the finger tab.

The finger tab may move toward a first end of the main body in a first lateral direction and toward a second end of the main body in a second lateral direction.

The finger covering stylus may further include a fingerprint scanner disposed on at least a portion of the main body to scan a fingerprint of at least one of the thumb and the finger in response to the main body receiving at least one of the thumb and the finger therein.

The finger covering stylus may further include a control unit disposed within at least a portion of the main body to transmit the scan of the fingerprint to an external device, such that the scan of the fingerprint unlocks the external device.

The finger covering stylus may further include a microphone disposed on at least a portion of the main body to enable access of the stylus tip in response to receiving at least one audio input of at least one authorized user, and prevent access of the stylus tip in response to receiving at least one audio input of at least one unauthorized user.

BRIEF DESCRIPTION OF THE DRAWINGS

These and/or other features and utilities of the present generally inventive concept will become apparent and more readily appreciated from the following description of the embodiments, taken in conjunction with the accompanying drawings of which:

FIG. 3 illustrates a side perspective view of the finger covering stylus, according to an exemplary embodiment of the present general inventive concept.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

LIST OF COMPONENTS

Finger Covering Stylus 100
Main Body 110
Rear Side 111
Front Side 112
Strap 113
Stylus Tip 120
Finger Tab 130
Fingerprint Scanner 140
Control Unit 150
Microphone 160
Power Source 170

Figure 1:
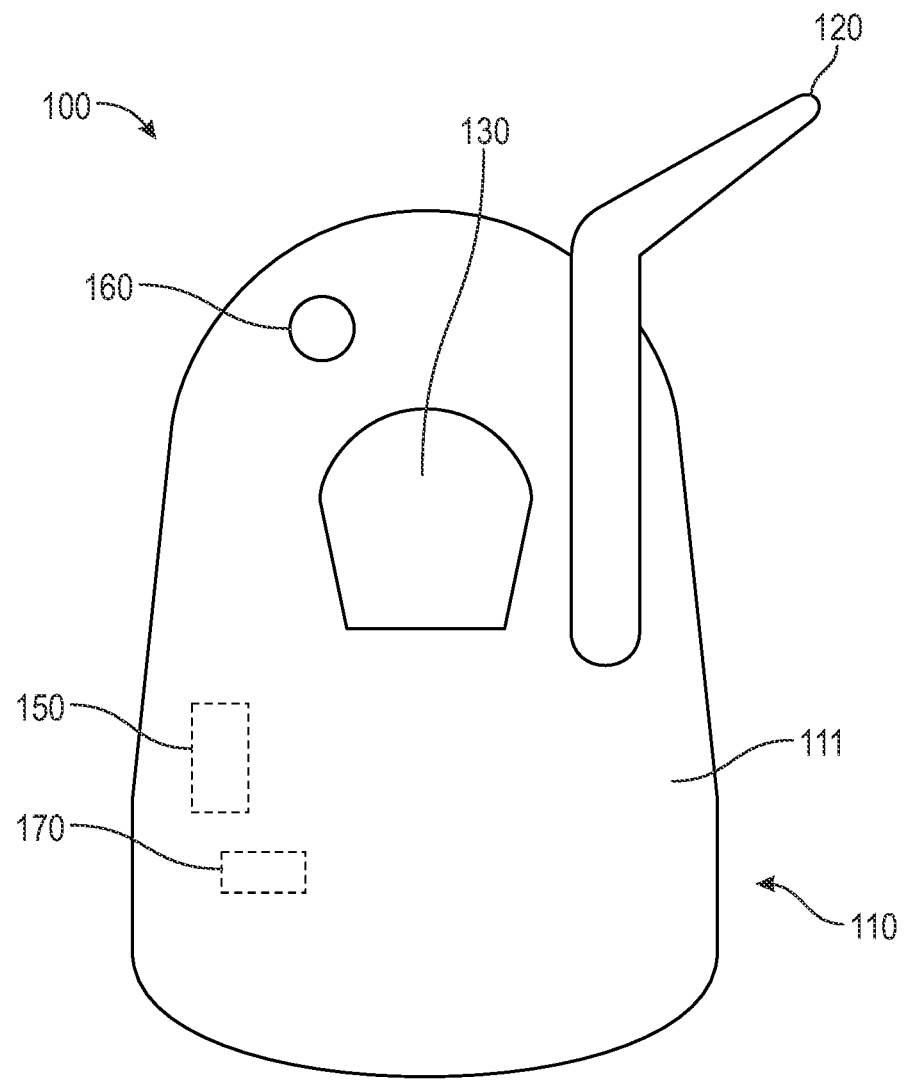
FIG. 1 illustrates a rear perspective view of a finger covering stylus, according to an exemplary embodiment of the present general inventive concept.

FIG. 1 illustrates a rear perspective view of a finger covering stylus 100, according to an exemplary embodiment of the present general inventive concept.

Figure 2:
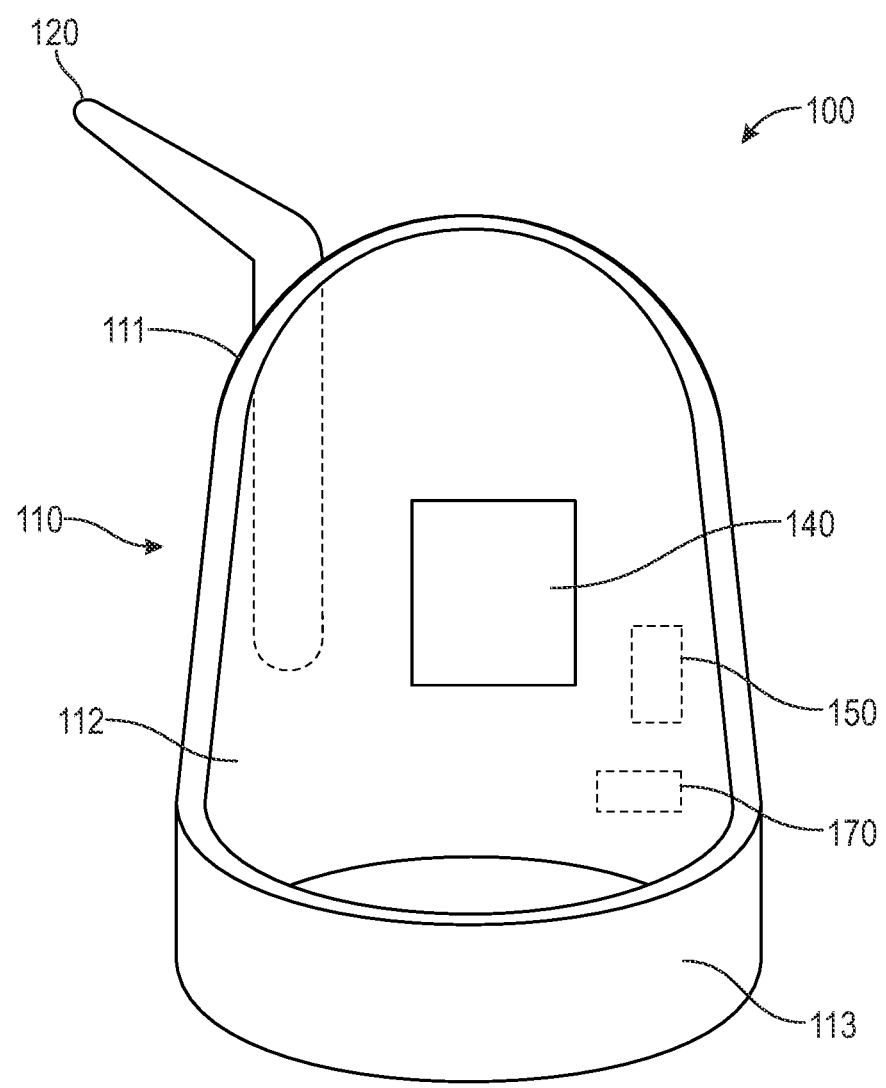
FIG. 2 illustrates a front perspective view of the finger covering stylus, according to an exemplary embodiment of the present general inventive concept.

FIG. 2 illustrates a front perspective view of the finger covering stylus 100, according to an exemplary embodiment of the present general inventive concept.

FIG. 3 illustrates a side perspective view of the finger covering stylus 100, according to an exemplary embodiment of the present general inventive concept.

The finger covering stylus 100 may be constructed from at least one of metal, plastic, wood, glass, and rubber, etc., but is not limited thereto.

The finger covering stylus 100 may include a main body 110, a stylus tip 120, a finger tab 130, a fingerprint scanner 140, a control unit 150, a microphone 160, and a power source 170, but is not limited thereto.

The main body 110 may be removably connected to at least a portion of a thumb and/or a finger of a user. In other words, the main body 110 may be worn on the thumb and/or the finger of the user.

The main body 110 may include a rear side 111, a front side 112, and a strap 113, but is not limited thereto.

The rear side 111 may be disposed on at least a portion of a first side of the main body 110. Referring to FIGS. 1 through 3, the rear side 111 may be convex shaped.

The front side 112 may be disposed on at least a portion of a second side of the main body 110 opposite with respect to the first side. Referring again to FIGS. 1 through 3, the front side 112 may be concave shaped. Additionally, the front side 112 may be concave corresponding to the convex shape of the rear side 111. The front side 112 may receive at least a portion of the thumb and/or the finger therein.

The strap 113 may be movably (i.e., slidably) disposed on at least a portion of a first edge of the front side 112. Moreover, the strap 113 may removably connect to at least a portion of a second edge of the front side 112 opposite with respect to the first edge. Alternatively, the strap 113 may be inserted within the main body 110 to connect therein. Also, the strap 113 may be elastic, such that the strap 113 may at least partially deform (e.g., bend, stretch, expand) in response to an application of force (e.g., pushing, pulling) thereto. As such, the strap 113 may be adjustable based on a size of the thumb and/or the finger of the user. Accordingly, the strap 113 may cover at least a portion of the thumb and/or the finger to prevent the main body 110 from moving away (i.e., falling off) the thumb and/or the finger while being worn. Referring again to FIG. 2, the strap 113 and/or a tip of the front side 112 may form a space therebetween, such that the tip of the front side 112 may be a portion of the rear side 111 and/or the front side 112 at a greatest distance from the strap 113.

The stylus tip 120 may include a light, but is not limited thereto.

The stylus tip 120 may be constructed of rubber, conductive foam, metal (e.g., copper), and an active (a.k.a., digital) stylus. The stylus tip 120 may be disposed on at least a portion of the rear side 111. The stylus tip 120 may removably connect to at least a portion of a touchscreen of an external device 10. Additionally, the stylus tip 120 may provide an input on the touchscreen of the external device 10 in response to contacting the touchscreen.

Furthermore, the stylus tip 120 may emit a beam of light (e.g., a laser beam) away from the stylus tip 120 to identify a direction of where the stylus tip 120 is pointed. In other words, the light from the stylus tip 120 may identify the position where the stylus tip 120 will contact to facilitate use of the touchscreen. Thus, the stylus tip 120 may prevent incorrect selection of items and/or objects on the touchscreen.

The finger tab 130 may be movably (i.e., slidably) and removably connected to at least a portion of the rear side 111. The finger tab 130 may move to adjust a position thereof with respect to a portion of the rear side 111. Moreover, a position of the finger tab 130 may be adjusted with respect to the rear side 111 based on a preference of the user. For example, the finger tab 130 may be moved toward a first end of the main body 110 in a first lateral direction and/or toward a second end of the main body 110 in a second lateral direction opposite with respect to the first lateral direction. Therefore, the finger tab 130 may provide a variety of positions to allow the main body 110 to rest on a surface, such as a table, such that the main body 110 is elevated based on a size (e.g., height, length, width) of the finger tab 130. In other words, the finger tab 130 may adjust a height of the main body 110 with respect to the surface in contact with the finger tab 130.

Alternatively, the finger tab 130 may be removably connected by snapping on and/or snapping off, such as a clipping on to the main body 110 and/or inserting into an aperture on the rear side 111.

The fingerprint scanner 140 may be disposed on at least a portion of the front side 112. The fingerprint scanner 140 may scan a fingerprint of the thumb and/or the finger in response to the front side 112 receiving the thumb and/or the finger.

The processing unit of the control unit 150 (or central processing unit, CPU) may include electronic circuitry to carry out instructions of a computer program by performing basic arithmetic, logical, control and input/output (I/O) operations specified by the instructions. The processing unit of the control unit 150 may include an arithmetic logic unit (ALU) that performs arithmetic and logic operations, processor registers that supply operands to the ALU and store the results of ALU operations, and a control unit that fetches instructions from memory and "executes" them by directing the coordinated operations of the ALU, registers and other components. The processing unit of the control unit 150 may also include a microprocessor and a microcontroller.

The communication unit of the control unit 150 may include a device capable of wireless or wired communication between other wireless or wired devices via at least one of Wi-Fi, Wi-Fi Direct, infrared (IR) wireless communication, satellite communication, broadcast radio communication, Microwave radio communication, Bluetooth, Bluetooth Low Energy (BLE), Zigbee, near field communication (NFC), and radio frequency (RF) communication, USB, global positioning system (GPS), Firewire, and Ethernet.

The storage unit of the control unit 150 may include a random access memory (RAM), a read-only memory (ROM), a hard disk, a flash drive, a database connected to the Internet, cloud-based storage, Internet-based storage, or any other type of storage unit.

The processing unit of the control unit 150 may access the Internet via the communication unit to allow the user to access a website, and/or may allow a mobile application and/or the software application to be executed using the processing unit. For ease of description, the mobile and/or the software application will be hereinafter referred to as an app. The app may be downloaded from the Internet to be stored on the storage unit of the control unit 150.

The control unit 150 may be disposed within at least a portion of the main body 110 and connected to the fingerprint scanner 140. The control unit 150 may receive the scan of the fingerprint from the fingerprint scanner 140 and transmit the scan of the fingerprint to the external device 10. Furthermore, the control unit 150 may unlock the external device 10 using the app. In other words, the control unit 150 may synchronize to external device 10 using the app to unlock the external device 10 from the scan of the fingerprint.

The microphone 160 may be disposed on at least a portion of the rear side 111. The microphone 160 may be connected to the control unit 150. The microphone 160 may receive at least one audio input therein. Moreover, the microphone 160 may record the at least one audio input corresponding to at least one authorized user, such that the control unit 150 may store the at least one audio input. Also, the microphone 160 may provide voice recognition, such that the control unit 150 may disable the stylus tip 120 in response to receiving at least one audio input of at least one unauthorized user. Accordingly, the microphone 160 may enable access of the stylus tip 120 in response to receiving at least one audio input of the at least one authorized user and prevent access of the stylus tip 120 in response to receiving at least one audio input of the at least one unauthorized user.

The power source 170 may include a battery, a solar cell, and a charging port, but is not limited thereto.

The power source 170 may be disposed on and/or within at least a portion of the main body 110. The power source 170 may provide power to the stylus tip 120, the fingerprint scanner 140, the control unit 150, and/or the microphone.

Therefore, the finger covering stylus 100 may provide precise and accurate contact with the touchscreen of the external device 10. Also, the finger covering stylus 100 may prevent direct contact of the thumb and/or the finger of the user with the touchscreen.

The present general inventive concept may include a finger covering stylus 100 to be worn on at least one of a thumb and a finger of a user, the finger covering stylus 100 including a main body 110, and a stylus tip 120 disposed on at least a portion of the main body 110 to removably connect to a touchscreen of an external device 10, such that the stylus tip 120 provides an input on the touchscreen of the external device 10 in response to contacting the touchscreen.

The main body 110 may include a rear side 111 disposed on a first side of the main body 110, a front side 112 disposed on a second side of the main body 110 opposite with respect to the first side, and a strap 113 movably disposed on at least a portion of a first edge of the front side 112 and removably connected to at least a portion of a second edge of the front side 112 to prevent the main body 110 from moving away from at least one of the thumb and the finger while being worn.

The strap 113 and a tip of the front side 112 may form a space therebetween.

The stylus tip 120 may emit a beam of light therefrom to identify a direction of where the stylus tip 120 is pointed.

The finger covering stylus 100 may further include a finger tab 130 removably connected to at least a portion of the main body 110 to adjust a height of the main body 110 with respect to a surface in contact with the finger tab 130.

The finger tab 130 may move toward a first end of the main body 110 in a first lateral direction and toward a second end of the main body 110 in a second lateral direction.

The finger covering stylus 100 may further include a fingerprint scanner 140 disposed on at least a portion of the main body 110 to scan a fingerprint of at least one of the thumb and the finger in response to the main body 110 receiving at least one of the thumb and the finger therein.

The finger covering stylus 100 may further include a control unit 150 disposed within at least a portion of the main body 110 to transmit the scan of the fingerprint to an external device 10, such that the scan of the fingerprint unlocks the external device 10.

The finger covering stylus 100 may further include a microphone 160 disposed on at least a portion of the main body 110 to enable access of the stylus tip 120 in response to receiving at least one audio input of at least one authorized user, and prevent access of the stylus tip 120 in response to receiving at least one audio input of at least one unauthorized user.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A finger covering stylus to be worn on at least one of a thumb and a finger of a user, the finger covering stylus comprising:
   a main body;
   a stylus tip having at least half of a length thereof disposed on and in contact with at least a portion of a rear surface of the main body on a curved surface of the main body to removably connect to a touchscreen of an external device, such that the stylus tip provides an input on the touchscreen of the external device in response to contacting the touchscreen, such that a first portion of the stylus tip is disposed at a center portion of the main body and extends to an end of the main body, and a second portion of the stylus tip is angularly disposed away from the first portion of the stylus tip, such that the stylus tip is bent; and a finger tab removably connected to an outer surface of the main body to adjust a height of the main body with respect to a surface in contact with the finger tab, such that the finger tab protrudes outwardly away from the outer surface of the main body.

2. The finger covering stylus of claim 1, wherein the main body comprises:

a rear side disposed on a first side of the main body;

a front side disposed on a second side of the main body opposite with respect to the first side; and a strap movably disposed on at least a portion of a first edge of the front side and removably connected to at least a portion of a second edge of the front side to prevent the main body from moving away from at least one of the thumb and the finger while being worn.

3. The finger covering stylus of claim 2, wherein the strap and a tip of the front side form a space therebetween.

4. The finger covering stylus of claim 1, wherein the stylus tip emits a beam of light therefrom to identify a direction of where the stylus tip is pointed.

5. The finger covering stylus of claim 1, wherein the finger tab moves toward a first end of the main body in a first lateral direction and toward a second end of the main body in a second lateral direction.

6. The finger covering stylus of claim 1, further comprising:

a fingerprint scanner disposed on at least a portion of the main body to scan a fingerprint of at least one of the thumb and the finger in response to the main body receiving at least one of the thumb and the finger therein.

7. The finger covering stylus of claim 6, further comprising:

a control unit disposed within at least a portion of the main body to transmit the scan of the fingerprint to an external device, such that the scan of the fingerprint unlocks the external device.

8. The finger covering stylus of claim 1, further comprising:

a microphone disposed on at least a portion of the main body to enable use of the stylus tip in response to receiving at least one audio input of at least one authorized user, and prevent use of the stylus tip in response to receiving at least one audio input of at least one unauthorized user.

9. A finger covering stylus to be worn on at least one of a thumb and a finger of a user, the finger covering stylus comprising:

a main body, comprising:

a rear side disposed on a first side of the main body, a front side disposed on a second side of the main body opposite with respect to the first side, and a strap movably disposed on at least a portion of a first edge of the front side and removably connected to at least a portion of a second edge of the front side to prevent the main body from moving away from at least one of the thumb and the finger while being worn;

a stylus tip having at least half of a length thereof disposed on and in contact with at least a portion of the rear side on a curved portion of the rear side to removably connect to a touchscreen of an external device, such that the stylus tip provides an input on the touchscreen of the external device in response to contacting the touchscreen, such that the stylus tip at least partially extends in an angular direction opposite with respect to a curvature direction of the strap; and a finger tab removably connected to an outer surface of the main body to adjust a height of the main body with respect to a surface in contact with the finger tab, such that the finger tab protrudes outwardly away from the outer surface of the main body.

* * * * *